July 12, 1966  E. FRISCH  3,261,007
MEASURING DEVICE FOR DETERMINING ANGULAR POSITION
Filed April 24, 1963  2 Sheets-Sheet 1

INVENTOR.
EBERHARD FRISCH
BY
ATTORNEYS

July 12, 1966 E. FRISCH 3,261,007
MEASURING DEVICE FOR DETERMINING ANGULAR POSITION
Filed April 24, 1963 2 Sheets-Sheet 2

INVENTOR.
EBERHARD FRISCH
BY
J. Russell Juten
ATTORNEYS

United States Patent Office 3,261,007
Patented July 12, 1966

1

3,261,007
MEASURING DEVICE FOR DETERMINING
ANGULAR POSITION
Eberhard Frisch, Berlin-Waidmannslust, Germany, assignor to Continental Elektroindustrie Aktiengesellschaft Askania-Werke, Berlin-Mariendorf, Germany
Filed Apr. 24, 1963, Ser. No. 275,384
11 Claims. (Cl. 340—206)

This invention relates in general to measuring devices and more particularly to a digital type of measuring device for determining the angular position of a rotating shaft.

Digital measuring devices are known to the prior art for determining the angular position of a rotating shaft. These devices consist of an electromechanical transducer which is coupled to the shaft whose angular position it is desired to measure. The transducer and associated equipment convert the angular position of the shaft into a time interval marked by two limiting pulses. The first limiting pulse starts a counter counting and the second limiting pulse stops the counting. In this fashion a counter measures the time interval between the limiting pulses and since the time interval between the limiting pulses is a function of shaft angular position, the counter thereby measures shaft angle position. Since the angular position is measured by a time interval, such digital devices cannot be used to provide a continuous shaft angle reading, but rather determine the angular position only at certain intervals of time, which intervals of time may be periodically or non-periodically selected.

If a shaft whose angle is to be measured is rotating at the time the signal to start the shaft angle reading is given, then a certain error will be introduced into the reading as a consequence of the fact that the reading takes place over a short period of time, during which period of time the shaft will be changing its angular position. It is to the elimination of this error that the invention is addressed.

The electromechanical transducer which is coupled to the shaft whose angle is to be measured generally contains a capacitive or inductive phase shifter such as a resolver which is fed by an A.C. voltage. The phase shifter in turn generates an A.C. voltage having the same frequency as the input voltage but whose phase angle is continuously variable as a function of the angular position of the rotating shaft. The phase angle of the generated A.C. voltage is thus shifted with respect to the A.C. voltage fed into the phase shifter; the latter A.C. voltage being used as a reference. The output voltage of this transducer is then transformed by means of a pulse forming circuit into a pulse sequence. The reference A.C. voltage is fed into another pulse forming circuit to establish a reference train of pulses which have a repetition rate equal to the repetition rate of the pulse train determined by the phase angle modulated output of the phase shifter. By counting the time interval between a pulse from the reference train and the next succeeding pulse in time from the phase angle modulated train of pulses, one can determine the angular position of the shaft being measured.

There are other devices where the shaft carries graduation lines on its circumference which are sensed by an electronic pulse generating sensing device that rotates about the shaft. The output of such a transducer is a train of electronic pulses whose difference in time is a function of the angular rotation of the shaft. These transducer produced pulses also shift in relation to corresponding pulses in a reference pulse train when the shaft rotates. Thus a measurement of the time interval between a pulse in the reference train of pulses and the next succeeding pulse in time from the transducer produced train of pulses will give a quantity which is directly proportional to the angular position of the shaft.

These prior art devices are generally adequate in cases where the shaft is at rest during the time when the shaft's angular position is being measured. However, in such devices it is characteristic that one pulse of the two limiting pulses which form the boundary of the time interval being measured, always shifts when the shaft rotates during the time interval being measured.

A time measuring process started at the moment $t_0$ is completed only at the moment $t_1 = t_0 + \Delta T$. Thus, $\Delta T$ is used herein to signify the time interval which is measured by the counter and which is proportional to the angular value being measured by the entire device. In the prior art devices the error present in $\Delta T$ is frequently small enough to be disregarded because $\Delta T$ itself is small and/or because only a small angular movement occurs during the measuring time, as where the speed of the shaft is relatively slow compared to the speed of measurement. In certain cases the result may even be error-free because the transducer is sufficiently coarse so that the error induced by shaft rotation is less than the precision of the transducer.

One proposal for correcting the error introduced by the fact that we wish to measure the shaft angle at a particular moment in time but must undertake measurement over a discrete period of time, is that the change in angular position of the shaft during the measuring interval be measured. The change in angular position of the shaft during the measuring interval could then be used to correct the recorded measuring results. The difficulty with such a proposal is that it introduces a cumbersome procedure and excessive additional equipment. The procedure is cumbersome particularly where, after each measurement, the corrected measuring result has to be read-out directly from the counting device. Where such direct read-out is required special digital computers have to be incorporated to correct the measuring results.

Accordingly, it is a broad purpose of this invention to eliminate the measurement error due to the rotation of the shaft in instruments which measure the angular position of a shaft.

It is another purpose of this invention to devise such an improvement without having to resort to the use of a digital computer.

An adequate comprehension of this invention can be had only after some detailed description of the prior art shaft angle measuring devices. However, to initially and briefly indicate how this invention operates, the shaft angle measuring instrument should be considered as a device which includes an electromechanical transducer that is coupled to the shaft. By means of the transducer the position of the shaft can be converted into a train of pulses which will be called herein a train of measurement pulses. In addition the instrument provides another train of pulses which can be called a reference train of pulses. These two trains of pulses have the same repetition rate. The phase relationship between a pulse in the measurement train and a pulse in the reference train is determined by the angular position of the shaft. The measuring instrument includes a means for measuring the time between a pulse in the reference train and a pulse in the measurement train and thereby measures the shaft angle position.

This means for measuring the time period between these pulses includes a gate through which a series of pulses having a relatively high repetition rate (for example 1 mc. as contrasted with 1 kc. for the reference pulse train) may be passed to a counter. The gate, however, is normally closed and is opened by receipt of a pulse from the reference train of pulses. The gate is closed by the receipt of a pulse from the measurement train of pulses. Thus, the number of high frequency pulses which pass through the gate between the receipt of the gate opening reference pulse and the gate closing measurement pulse is a measure of the time interval between those two pulses and thus a direct measure of the shaft angle position. A counter at the output of the gate counts the number of such high frequency pulses that pass through the gate and thus provides the digital shaft angle measuring technique.

As has been indicated above, the fact that the shaft is rotating during the measuring period introduces an error into the phase of the pulses in the measurement train of pulses. This invention corrects that error by providing a correction signal, which correction signal has a magnitude that is a function of shaft angular speed. The correction signal is used to appropriately shift the time at which the measurement pulse reaches the gate to close off the gate. This correcting signal, thereby, shifts the phase position of the correcting pulse in a direction and to an extent necessary to compensate for the error induced by the velocity of the shaft during measurement. Since the magnitude of the correcting signal is a function of shaft angular speed and the amount of error is also a function of shaft rotational speed, the magnitude of the correction can be made to correlate with the magnitude of the error introduced.

Other purposes and objects of this invention will become apparent from a consideration of the following detailed description and drawings, in which:

FIG. 1 is a first embodiment of this invention in which a tachometer and integrating circuit is used to provide the correcting signal;

FIG. 2 compares the time relationship between the reference train of pulses and the measurement train of pulses which are used respectively to open and close the gate in the instrument;

Preliminary, to a reference to the figures, it would be valuable to set down the relationship between the error, the time of measurement, and the error-free measuring time.

In the following discussion, the following symbols will be used with the meaning indicated immediately below:

$t_0$ = the time at which a reference pulse turns on the gate and starts the counter counting.
$t_1$ = the time at which an error-free measurement pulse turns off the gate.
$\Delta T = t_1 - t_0$, or error-free time interval.
$t^*$ = the time at which an uncorrected measurement pulse would, if uncorrected, shut off the gate.
$\Delta T^* = t^* - t_0$, or, the phase difference in time between the output of the transducer 2 and the reference signal.
$d\Delta T$ = the difference between $\Delta T^*$ and $\Delta T$, or, the error appearing in the signal produced by the transducer 2.

$\Delta T^*$ stands for the actual measurement time and stands for the error-free measurement time which is ideally desired but not achieved because of the rotating shaft 1, but which is achieved in terms of the measurement pulse that shuts off the gate 17 because of the means provided by this invention.

Figure 1:
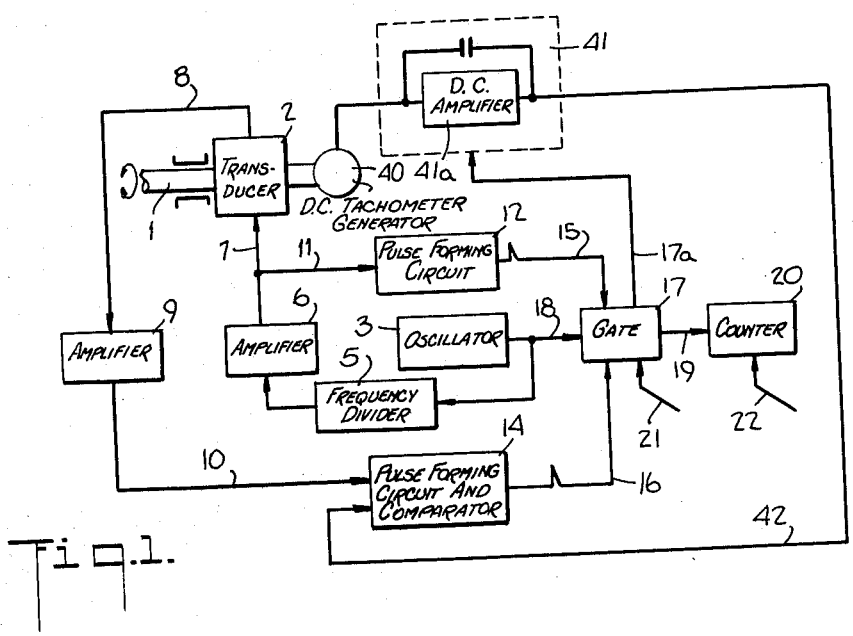

With reference to the first embodiment, shown in FIG. 1, a rotating shaft 1 is coupled to a transducer 2. The shaft 1 might be the shaft of an optical target tracking instrument such as the cinetheodolite. The angular position of the shaft 1 is to be recorded at discrete periods of time either periodically or non-periodically. A resolver is a typical type of transducer 2 which would be used in this type of application.

A one-megacycle (1 mc.) oscillator 3 provides an output signal which is fed by way of line 4 to a frequency dividing circuit 5, which frequency dividing circuit 5 provides a one kilocycle (1 kc.) output. This 1 kc. output is amplified by an amplifier 6 and fed along line 7 to become an input to the transducer 2. The transducer 2 then provides a 1 kc. output signal in line 8, which signal is out of phase with the 1 kc. input signal by a phase angle $\psi$, which phase angle $\psi$ is a function of the angle at which the shaft 1 is positioned during the measurement interval. Accordingly, the 1 kc. input signal to the transducer 2 is a reference signal and the 1 kc. output signal from the transducer 2 is a measurement signal. This measurement signal carries information concerning the angular position of the shaft 1 in its phase deviation from the reference signal.

Since the phase difference between the measurement signal in line 8 and the reference signal in line 7 is a measurement of the shaft 1 angular position, the measuring instrument must include a technique for measuring this phase difference. The technique used involves opening a gate 17 for a period of time comparable to the phase difference between the measurement signal and the reference signal.

The gate 17 is opened and closed by the receipt of pulses and thus the generally sinusoidal reference signal and the generally sinusoidal measurement signal must be converted to two separate trains of pulses. The sinusoidal 1 kc. reference signal is fed along line 11 to the input of a pulse forming circuit 12, such as a one shot. The output of the pulse forming circuit 12 is thus a 1 kc. series of spikes which are fed along line 15 to the enabling input of the normally closed gate 17. The sinusoidal output of the transducer is fed along line 8 to be amplified by line 9 and then fed by line 10 to the input of a pulse forming circuit 14. The pulse forming circuit 14 then provides a 1 kc. train of pulses at its output which are conducted along line 16 to the disabling input of the gate 17.

Figure 2:
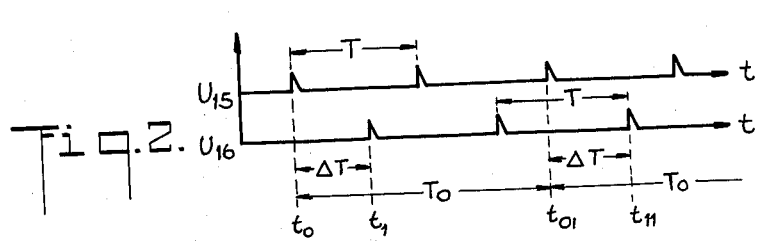

In the particular embodiment here discussed, both pulse forming circuits 12 and 14 are designed to provide a pulse at their output at the moment when their input voltage is zero and where the momentary value is changing from negative to positive. Thus the pulse train in line 16 has the same phase relationship to the pulse train in line 15 as has the sinusoidal signal in line 8 to the sinusoidal signal in line 7. FIG. 2 illustrates the relationship between the pulse trains in lines 15 and 16.

As may be seen in FIG. 2, the time period T between two successive spikes within either the reference train of pulses $U_{15}$ or the measurement train of pulses $U_{16}$ is identical, just as is the frequency of the reference signal in line 7 identical to the measurement signal frequency in line 8. However, the pulses in train $U_{16}$ are shifted by an amount $\Delta T$ with respect to the pulses in train $U_{15}$. The magnitude of the shift $\Delta T$ directly relates to the angular position of the shaft 1 at the time of measurement. In order to read $\Delta T$, and thus in order to read the angular position of the shaft 1, the electronic gate 17 is opened for the period of time represented by T. While this gate 17 is open, a 1 mc. signal is admitted from the oscillator 3 along line 18 through the gate 17 along line 19 to a counter 20. The counter 20 counts the number of cycles in the 1 mc. signal during the period of time when the gate 17 is open.

The precision of this counting technique is limited only by the relationship between the frequency in the oscillator 3 and the frequency of the reference and measurement signals. Since the oscillator 3 provides, in this embodiment, a 1 mc. signal and the measurement frequency is 1 kc. the gate 17 and counter 20 arrangement just described is adequate to identify 1,000 shaft angle positions (1 mc. divided by 1 kc.). In other words, a minimum count of one indicates a shaft 1 angle position equal to one one-thousandth of 360°.

Gate 17 is, of course, normally closed. When it is desired to measure the angular position of the shaft 1, a preliminary pulse is provided to the gate 17 along line 21 which puts the gate 17 in condition to be enabled by the next pulse received along line 15. The gate 17 could, of course, be constructed so that no preliminary pulse along the line 21 would be needed and the gate 17 would then automatically open and close once for each time period T. In any case, in the embodiment shown, after the preliminary pulse 21, the next following pulse in line 15 will open the gate enabling the pulses of oscillator 3 to reach the entrance to the counter 20 and to be counted. The next succeeding pulse in time from line 16 will close the gate 17 so that the gate 17 will be open only during the time interval $\Delta T$ (see FIG. 2). Thus the count recorded in counter 20 is equivalent to the measured value of the angular position of the shaft 1.

Figure 3:
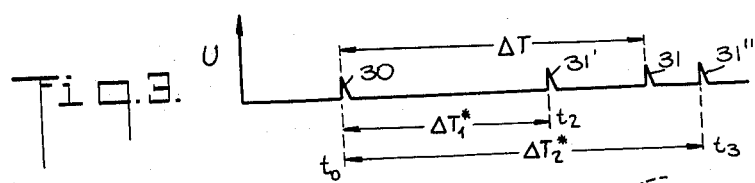
FIG. 3 is a time plot of pulses to indicate the measuring error that is introduced in the measurement train of pulses when no correcting signal is applied.

FIG. 3 may be used to illustrate the measuring error in a device of this nature. An opening pulse 30 at gate 17 appears at the moment $t_0$. The closing pulse 31 appears at the moment $t_1$ in the case where the shaft 1 is at rest. However, when the shaft 1 rotates during the time the counter 20 is counting, the closing pulse 31 moves either in the direction of pulse 30 (so that the counting time interval is extended). The direction of rotation of the shaft 1 determines whether or not the pulse 31 moves toward or away from the reference pulse 30. Where the pulse 31 moves towards the reference pulse 30, a pulse $31'$, appearing at the moment $t_2$, becomes the closing pulse and the time interval measured is $\Delta T_1^*$. Where the pulse 31 moves away from the reference pulse 30, a pulse $31''$ appears at the moment $t_3$ so that a $\Delta T_2^*$ time period is measured instead of the error free time period $\Delta T$.

To correct this error, shaft 1 is coupled to a tachometer generator 40. The tachometer generator 40 generates a D.C. voltage proportional to the angular velocity of the shaft 1. Not only is the absolute magnitude of the tachometer generator 40 output a function of shaft 1 angular velocity but the direction of the shaft 1 rotation will determine whether or not the tachometer 40 output is positive or negative. The output voltage of the tachometer generator 40 is fed through an integrating circuit 41 and from the integrating circuit 41 along the line 42 to the pulse forming circuit 14.

The integrating circuit 41 may conveniently be a D.C. amplifier 41a with a capacitor feed-back C. The input end of the D.C. amplifier 41a is normally shorted so that the D.C. voltage output is zero at the start of a measurement. As soon as the gate 17 is opened by a reference pulse 30, a signal along the line 17a causes the input of the integrator 41 to open. Accordingly, the output of the integrator 41 is a D.C. voltage which linearly increases or decreases during the measuring time interval.

In the embodiment shown in FIG. 1, the measurement pulse forming circuit 14 is constructed as a voltage comparator so that a pulse is generated at the circuit 14 output at the moment the instantaneous value of the sinusoidal measurement voltage in line 10 is increasing and equals the instantaneous value of the linearly increasing D.C. voltage in line 42. Since the output of the tachometer generator 40 is a function of shaft 1 speed, the rate at which the integrating circuit 41 causes the voltage in line 40 to build up will be a function of shaft 1 speed. Thus the point in time at which the voltage in line 42 will equal the instantaneous voltage in line 10 will be a function of shaft 1 speed. Accordingly, the position, in time, of the pulse put out by the pulse forming circuit in comparator 14 will be a function of shaft speed as well as a function of the phase of the measurement voltage in line 10.

Figure 4:
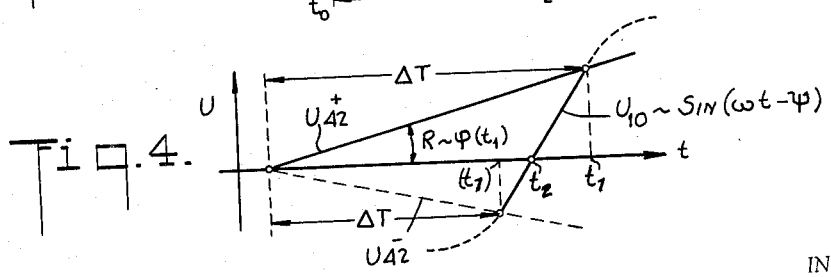
FIG. 4 is a mathematical model used to illustrate the delay or advance of the pulses in the measurement train of pulses when a correction signal is applied.

FIG. 4 is a mathematical model which illustrates this situation. A small portion of the sinusoidal voltage $U_{10}$ which appears in line 10 is illustrated. The portion of $U_{10}$ shown in FIG. 4 includes the portion that passes through zero at the time $t_2$ and that would, if uncorrected, cause a pulse $31'$ to be produced at the time $t_2$ to shut off the gate 17. The solid line $U_{42}$ is a time chart of the voltage output of the integrator 41, which is the voltage that appears in the line 42. For the purposes of this illustration, it is assumed that the angular velocity of the shaft 1 remains constant so that $U_{42}$ is linear.

However, angular acceleration will also be compensated for by the device of this invention since such acceleration will merely cause the time chart of $U_{42}$ to be non-linear. Since the circuit 41 is an integrating circuit, its output will be the cumulative result of the instantaneous speed at each instantaneous position during the measuring period and thus will provide the appropriate compensation herein described even where there is angular acceleration of the shaft 1 during the measuring period.

Referring again to FIG. 4, the uncorrected situation would provide an output pulse from the circuit 14 at the moment $t_2$, which is the moment when the measurement signal $U_{10}$ has a magnitude of zero as it goes from the negative value to a positive value. However, with the improvement of this invention incorporated in the measuring instrument, the time when the pulse 31 is produced by the pulse forming circuit 14 is delayed to the point $t_1$. This means that the gate 17 is open for a longer interval than it would be without the corrective means of this invention. By a proper calibration of the instrument, the extension from the time $t_2$ to the time $t_1$ can be made exactly equal to the error $d\Delta T$ and thus can completely compensate for the error.

A Schmitt trigger is one type of pulse forming circuit which can be readily adapted to become the pulse forming circuit in comparator 14 required for the embodiment illustrated in FIG. 1. The Schmitt trigger is adapted to form a pulse as the input signal to the Schmitt trigger passes through zero and then, by means of some differentiating device, to provide a spike pulse output in the line 16 representing the point at which the input signal crosses the zero magnitude axis. The integrating circuit 41 output $U_{42}$ can then be used to so bias the Schmitt trigger that the Schmitt trigger will fire when the measurement signal $U_{10}$ crosses the $U_{42}$ line. Thus the $U_{42}$ line takes the place of the zero voltage ($t$ axis) line. In this manner, the integrating circuit 41 output $U_{42}$ is used to shift the phase point at which a pulse 31 is supplied to shut off the gate 17.

The dotted line $U_{42}$ in FIG. 4 illustrates the shortening of the measuring time interval, which is required when the desired pulse 31 would otherwise be moved to the position indicated by the pulse $31''$ in FIG. 3. In such a case, the correcting voltage $U_{42}$ is shown as a decreasing dotted line magnitude which intercepts the measurement voltage $U_{10}$ at the time point ($t_1$).

After the measurement has been taken, and the gate 17 closed, a signal along line 17a causes the input to the integrator 41 to short. The count result in the counter 20 may be stored by some appropriate means and the counter cleared through a pulse by way of line 22 so that the measuring device is ready for a new measurement.

Figure 5:
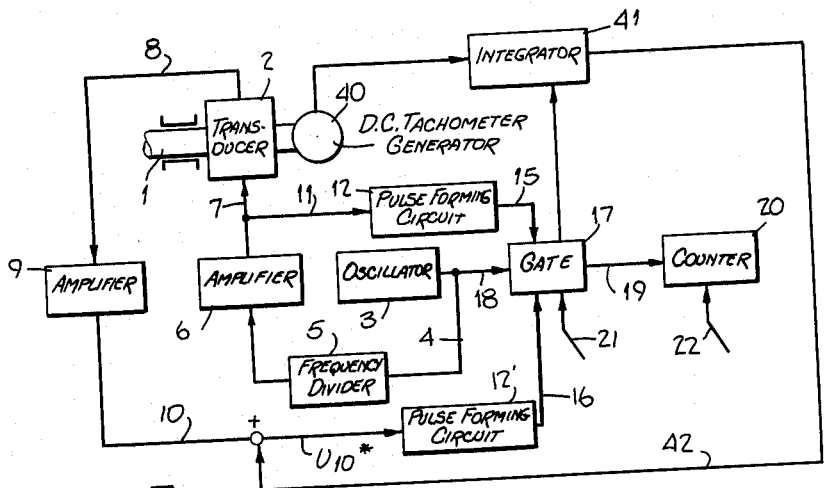
FIG. 5 is a block diagram illustrating a second embodiment of this invention.

FIG. 5 shows an embodiment wherein the corrective voltage $U_{42}$ is directly added to the measurement voltage $U_{10}$ to form a summation voltage $U^*_{10}$ which serves as the input to a pulse forming circuit $12'$. The circuit layout in FIG. 5 is substantially the same as that of FIG. 1, except that the pulse generating stage $12'$ is one which is similar to the pulse forming circuit 12. The correction voltage $U_{42}$ (which is supplied by the integrator 41 and which increases linearly in time from the start of the count of the counter 20) is fed directly to the line 10 instead of to a second input to the pulse forming circuit 12'. The correction voltage $U_{42}$ can be expressed as: $U_{42}=ukt$. The measurement voltage can be expressed as: $U_{10}=u \sin(\omega t-\psi)$, in which $\psi$ (psi) represents the phase angle difference between the measurement voltage $U_{10}$ and the reference voltage which appears in lines 7 and 11. Accordingly, the sum of these two voltages, which becomes the input to the pulse forming circuit 12', is: $U^{*}_{10}=u \sin(\omega t-\psi)+ukt$.

Since psi ($\psi$) represents the phase angle displacement between the reference signal $U_7$ and the measurement signal $U_{10}$ it follows that the time period for the uncorrected measurement is $\psi/\omega$. After the correction signal $U_{42}$ has been added to the measurement signal $U_{10}$, a combined signal is fed as the input to the pulse forming circuit 12' which has an effective measuring time interval of approximately: $\psi/\omega$ $(1-k/\omega)$. This approximation assumes that $(k/\omega)^2$ is very much less than 1 so that it may be dropped out of the expression.

Thus, in the FIG. 5 embodiment, the ratio between the corrected $U^{*}_{10}$ and the uncorrected $U_{10}$ measuring time period is $(1-k/\omega)$. Accordingly, the parameters of the tachometer generator 40 and of the integrator 41 can be selected so that any desired value of $k$ can be obtained and the needed error correction achieved.

Figure 6:
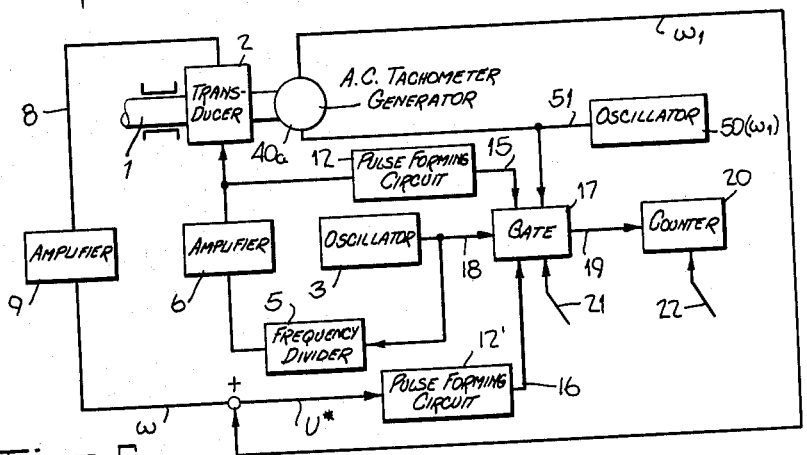
FIG. 6 is a block diagram illustrating a third embodiment of this invention.

FIG. 6 illustrates a third embodiment of this invention in which the correcting voltage is an A.C. voltage that is proportional to the angular velocity of the shaft 1. The technique and principle involved is essentially the same as that described in connection with the embodiment shown in FIG. 5. The correcting voltage $U_{42}$ and the measurement voltage $U_{10}$ are added together in the line 10 to provide a combined input $U^*$ for the pulse forming circuit 12'. In the case of FIG. 6, the correcting voltage $U_{42}$ equals $u \cdot k \cdot \sin(\omega_1 t)$. When this voltage is added to the measuring A.C. voltage $U_{10}$, the resulting voltage $U^*$ is such that the phase angle relationship between the resulting voltage and the reference voltage is:

$$(1-k^*)\omega_1/\omega$$

in which it is assumed that certain second order terms such as $(k^*\omega_1/\omega)^2$ and $(\omega_1/\omega)^2$ are very much less than 1. Since $k^*$ (like the $k$ of FIG. 5) can be designed to be a function of angular velocity, the above correction factor will operate to correct for the error introduced by the angular velocity of the shaft. To obtain this result in FIG. 6, an A.C. tachometer generator 40a is coupled to the shaft 1. The A.C. tachometer generator 40a is energized by a frequency $\omega_1$ from an oscillator 50. It is important that this oscillator 50 frequency $\omega_1$ be substantially less than the measurement voltage frequency $\omega$ (the latter being 1 kc. in the embodiments herein described). The necessity for a considerably lower correcting voltage frequency can be in part appreciated by referring to the terms above which were considered to be negligible in the derivation of the phrase expressing the correction factor. It is also important that the phase angle of the correction voltage at the onset of each counting process should be either in phase or completely out of phase with respect to the reference A.C. voltage which opens the gate 17 and starts the counter 20 counting. If desired, the frequency of generator 40a may be determined by means of a frequency divider stage which in turn is linked to the main oscillator 3.

Figure 7:
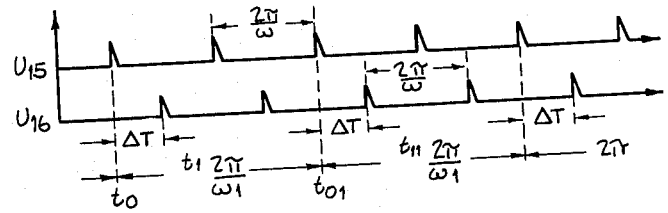
FIG. 7 is a chart of pulses against time to illustrate the measuring process carried out with the embodiment of FIG. 6.

FIG. 7 illustrates the measuring process carried out by the FIG. 6 embodiment. Measurements are made in intervals of $2\pi/\omega_1$. In the preferred application of this invention, the correction A.C. voltage of FIG. 6 ($U_{42}$) is added to the reference voltage of line 11 as well as to the measurement voltage of line 10. In that particular application, the interval between measurements need not be strictly related to the frequency $\omega_1$.

Although the above invention has been described with some particularity and a number of related embodiments are disclosed, it should be understood that there are a number of variations which would be obvious to the man skilled in this art and which may be incorporated without departing from the scope of this invention. In general, it should be remembered that the above description of what occurs is somewhat simplified and that the corrections provide only approximations to the theoretically correct measuring time intervals. These approximations, however, achieve excellent results particularly where the error $d\Delta T$ is relatively small compared to the measurement time $\Delta T$.

The correction which reduces or increases the time interval during which the gate 17 is open can be produced in various ways. The extent by which the time interval $\Delta T$ is changed is strictly a function of the change in angular position of the shaft 1 during the measurement interval, the change of position of the shaft 1 being in turn a function of angular velocity and angular acceleration. In many cases, correction with regard to the angular acceleration of the shaft can be disregarded. Frequently the error through acceleration is very small compared to the error caused by the velocity since in many situations angular acceleration change is very slight during the course of time it takes to make a shaft angle measurement. In such cases the correction of the measured value is particularly simple.

For simplicity of exposition, the above detailed description generally assumes that there is no angular acceleration and thus that there is a linear relation between the correction voltage $U_{42}$ and time. However, the particular techniques described for generating a correction signal are ones which are applicable where there is an error due to acceleration as well as the error due to angular velocity.

What is claimed is:

1. A shaft angle measuring device comprising:
   electromechanical transducer means for converting the angular position of said shaft into a time interval which is limited by two electronic pulses, the duration of said time interval being a function of the angular position of said shaft, and
   correction means coupled to said shaft to provide a correction signal which is a function of the angular speed of said shaft to change the temporal incidence of one of said two electronic pulses and thereby change the duration of said time interval, whereby the duration of said time interval may be modified as a function of the speed of said shaft.

2. In a shaft angle measuring device having electromechanical transducer means for converting a shaft angle position into a time interval bounded by two electrical pulses, the time interval between the two pulses being a function of the angular position of said shaft, the improvement comprising: correction transducer means for providing a correction signal, a characteristic of said correction signal being a function of the angular speed of the shaft whose angle is being measured, said correction signal being coupled to said electromechanical transducer means to exert a partial control over the time interval between said two pulses, the extent of said control being a function of the value of said characteristic.

3. A shaft angle measuring device comprising:
   main electro-mechanical transducer means adapted to be coupled to a shaft for converting the angular position of said shaft into a time interval which is marked by two electronic pulses, the duration of said time interval being a function of the angular position of said shaft, and
   secondary electro-mechanical transducer means adapted to be coupled to a shaft to provide a correction signal having a magnitude which is a function of the angular speed of said shaft, said correction signal being coupled to said main electro-mechanical transducer means to change the temporal incidence of one of said two electronic pulses and thereby change the duration of said time interval, whereby the duration of said time interval may be modified as a function of the speed of said shaft so that said measuring device will measure the angular position of a rotating shaft.

4. A shaft angle measuring device comprising:
a main electro-mechanical transducer means adapted to be coupled to a shaft for converting the angular position of said shaft into a time interval which is marked by two electronic pulses, the duration of said time interval being a function of the angular position of said shaft,
a D.C. tachometer adapted to be coupled to the shaft to be measured to provide an output voltage whose magnitude is a function of shaft speed, and
an integrating circuit connected to the output of said tachometer to provide a correction signal, said correction signal being coupled to said main electro-mechanical transducer to partially determine said time interval between said pulses as a function of shaft speed.

5. A shaft angle measuring device comprising:
a main electro-mechanical transducer means adapted to be coupled to a shaft for converting the angular position of said shaft into a time interval which is marked by two electronic pulses, the duration of said time interval being a function of the angular position of said shaft, said means including a transducer to provide a measurement signal having a phase relationship to a reference signal which is a function of the angular position of the shaft being measured, said means also including a pulse forming circuit having said measurement signal connected to its input to provide as its output one of said pulses,
a D.C. tachometer adapted to be coupled to the shaft to be measured to provide an output voltage whose magnitude is a function of shaft speed, and
an integrating circuit connected to the output of said tachometer to provide a correction signal, said correction signal being connected as a bias to said pulse forming circuit, thereby exerting a partial influence on the phase angle at which said second pulse forming circuit converts said measurement signal to said one of said pulses.

6. A shaft angle measuring device comprising:
a main electro-mechanical transducer means adapted to be coupled to a shaft for converting the angular position of said shaft into a time interval which is marked by two electronic pulses, the duration of said time interval being a function of the angular position of said shaft, said means including a transducer to provide a measurement signal having a phase relationship to a reference signal which is a function of the angular position of the shaft being measured, said means also including a pulse forming circuit having said measurement signal connected to its input to provide as its output one of said pulses,
a D.C. tachometer adapted to be coupled to the shaft to be measured to provide an output voltage whose magnitude is a function of shaft speed, and
an integrating circuit connected to the output of said tachometer to provide a correction signal, said correction signal being added to said measurement signal to provide a modified measurement signal, said modified measurement signal being connected to the input of said pulse forming circuit,
whereby the temporal incidence of said one of said pulses, and thus said time interval between said pulses, is partially determined by the speed of the shaft being measured.

7. A shaft angle measuring device comprising:
a main electro-mechanical transducer means adapted to be coupled to a shaft for converting the angular position of said shaft into a time interval which is marked by two electronic pulses, the duration of said time interval being a function of the angular position of said shaft, said means including a transducer to provide a measurement signal having a phase relationship to a reference signal which is a function of the angular position of the shaft being measured, said means also including a pulse forming circuit having said measurement signal connected to its input to provide as its output one of said pulses,
an A.C. tachometer adapted to be coupled to the shaft to be measured to provide an A.C. correction voltage whose magnitude is a function of shaft speed,
said A.C. correction voltage being added to said measurement signal to provide a modified measurement signal, said modified measurement signal being connected as the input to said pulse forming circuit,
whereby the temporal incidence of said one of said pulses, and thus said time interval between said pulses, is partially determined by the speed of the shaft being measured.

8. A device for determining the angular position of a rotating shaft comprising:
a reference signal source,
a transducer adapted to be coupled to a shaft and having its input connected to said reference signal source for converting the angular position of a shaft into a measurement signal, said measurement signal having a phase relationship to said reference signal which is a function of the angular position of the shaft being measured,
first pulse forming circuit means for converting said reference signal to a reference train of pulses,
second pulse forming means for converting said measurement signal to a measurement train of pulses,
counting means coupled to said reference train of pulses and to said measurement train of pulses to measure the time interval between one of the pulses in said measurement train of pulses and the next successive pulse in said measurement train of pulses,
correction means adapted to be coupled to the shaft being measured to provide a correction signal which is a function of the angular speed of said shaft, said correction signal being coupled to said second pulse forming means to change the phase relationship between said measurement train of pulses and said reference train of pulses as a function of the magnitude of said correction signal.

9. A shaft angle measuring device comprising:
a reference signal source,
a transducer adapted to be coupled to a shaft and having its input connected to said reference signal source for converting the angular position of a shaft into a measurement signal, said measurement signal having a phase relationship to said reference signal which is a function of the angular position of the shaft being measured,
first pulse forming circuit means for converting said reference signal to a reference pulse,
second pulse forming circuit means for converting a measurement signal to a measurement pulse,
counting means coupled to said reference pulse and to said measurement pulse to measure the time interval between said pulses,
a D.C. tachometer adapted to be coupled to the shaft to be measured to provide an output voltage whose magnitude is a function of shaft speed, and
an integrating circuit connected to the output of said tachometer to provide a correction signal, said correction signal being added to said measurement signal to provide a modified measurement signal, said modified measurement signal being connected to the input of said second pulse forming circuit means,
whereby the pulse output of said second pulse forming circuit means has a phase relationship to said reference pulse that is partially determined by the speed of the shaft being measured.

10. A shaft angle measuring device comprising:
a reference signal source,
a transducer adapted to be coupled to a shaft and having its input connected to said reference signal source for converting the angular position of a shaft into a measurement signal, said measurement signal having a phase relationship to said reference signal which is a function of the angular position of the shaft being measured,
first pulse forming circuit means for converting said reference signal to a reference pulse,
second pulse forming circuit means for converting said measurement signal to a measurement pulse,
counting means coupled to said reference pulse, and to said measurement pulse to measure the time interval between said pulses,
a D.C. tachometer adapted to be coupled to the shaft to be measured to provide an output voltage whose magnitude is a function of shaft speed, and
an integrating circuit connected to the output of said tachometer to provide a correction signal, said correction signal being connected as a bias to said second pulse forming circuit, thereby exerting a partial influence on the phase angle at which said second pulse forming circuit converts said measurement signal to a measurement pulse.

11. A shaft angle measuring device comprising:
a reference signal source,
a transducer adapted to be coupled to a shaft and having its input connected to said reference signal source for converting the angular position of a shaft into a measurement signal, said measurement signal having a phase relationship to said reference signal which is a function of the angular position of the shaft being measured,
first pulse forming circuit means for converting said reference signal to a reference pulse,
second pulse forming circuit means for converting a measurement signal to a measurement pulse,
counting means coupled to said reference pulse and to said measurement pulse to measure the time interval between said pulses, and
an A.C. tachometer adapted to be coupled to the shaft to be measured to provide an A.C. correction voltage whose magnitude is a function of shaft speed, the frequency of said correction voltage being substantially less than the frequency of said measurement signal,
said A.C. correction voltage being added to said measurement signal to provide a modified measurement signal, said modified measurement signal being connected as the input to said second pulse forming circuit means,
whereby the measurement pulse output of said second pulse forming circuit means has a phase relationship to said reference pulse that is partially determined by the speed of the shaft being measured.

No references cited.

NEIL C. READ, *Primary Examiner.*

T. B. HABECKER, *Assistant Examiner.*